(12) United States Patent
Shrestha

(10) Patent No.: US 11,797,430 B2
(45) Date of Patent: Oct. 24, 2023

(54) CONFIGURATION-DRIVEN DATA CONVERSION AND HOSTING FOR SOFTWARE DEVELOPMENT SYSTEMS AND METHODS

(71) Applicant: T-Mobile USA, Inc., Bellevue, WA (US)

(72) Inventor: Ayush Shrestha, Atlanta, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 139 days.

(21) Appl. No.: 17/542,314

(22) Filed: Dec. 3, 2021

(65) Prior Publication Data
US 2023/0176960 A1    Jun. 8, 2023

(51) Int. Cl.
*G06F 11/36* (2006.01)
*G06F 16/245* (2019.01)
*G06F 16/25* (2019.01)
*G06F 9/445* (2018.01)

(52) U.S. Cl.
CPC ...... *G06F 11/3688* (2013.01); *G06F 9/44505* (2013.01); *G06F 16/245* (2019.01); *G06F 16/258* (2019.01)

(58) Field of Classification Search
CPC ............. G06F 9/44505; G06F 11/3688; G06F 16/245; G06F 16/258
See application file for complete search history.

(56) References Cited

U.S. PATENT DOCUMENTS

| | | | |
|---|---|---|---|
| 5,907,705 A | 5/1999 | Carter | |
| 6,094,655 A | 7/2000 | Rogers et al. | |
| 6,094,684 A | 7/2000 | Pallmann | |
| 6,370,569 B1 | 4/2002 | Austin | |
| 7,165,239 B2 | 1/2007 | Hejlsberg et al. | |
| 7,237,013 B2 | 6/2007 | Winkeler et al. | |
| 7,444,302 B2 | 10/2008 | Hu et al. | |
| 7,539,591 B2 * | 5/2009 | House | G06F 11/263 |
| | | | 702/122 |
| 7,568,184 B1 | 7/2009 | Roth | |
| 7,712,073 B1 | 5/2010 | Srinivasan et al. | |

(Continued)

FOREIGN PATENT DOCUMENTS

| EP | 1019857 A1 | 7/2000 |
|---|---|---|
| EP | 2188740 A2 | 5/2010 |

(Continued)

*Primary Examiner* — Douglas M Slachta
(74) *Attorney, Agent, or Firm* — Perkins Coie LLP

(57) ABSTRACT

Systems and methods for converting data to a standardized format for provisioning to software applications. A software program is initialized and a function of the software program is identified for evaluation. The function uses data in a standardized format. A configuration file for the software program is identified, which specifies one or more data sources containing data that is not in the standardized format and one or more endpoints. The data is loaded into an internal data structure, based on the configuration file, and a web server is generated to provision the data to the software program in the standardized format. The software program generates a request for at least a portion of the data. The data is received in the standardized format and used by the software program to evaluate the at least one function.

20 Claims, 6 Drawing Sheets

(56) References Cited

U.S. PATENT DOCUMENTS

| | | | |
|---|---|---|---|
| 7,739,670 B2 | 6/2010 | Gutfleisch et al. | |
| 7,761,591 B2 | 7/2010 | Graham | |
| 8,346,803 B2 | 1/2013 | Chang | |
| 9,959,108 B2 | 5/2018 | Fu et al. | |
| 10,108,535 B2 | 10/2018 | Aggarwal et al. | |
| 10,289,978 B2 | 5/2019 | Lu et al. | |
| 10,339,114 B2 | 7/2019 | Schnase et al. | |
| 10,621,193 B2* | 4/2020 | Bradham | G16H 10/20 |
| 10,650,016 B2* | 5/2020 | A. C. | G06F 16/254 |
| 10,824,544 B1* | 11/2020 | Nagal | G06Q 40/02 |
| 10,824,802 B2 | 11/2020 | Chen | |
| 10,896,078 B1 | 1/2021 | Burns et al. | |
| 10,949,609 B2 | 3/2021 | Castañeda-villagrán | |
| 2002/0108050 A1 | 8/2002 | Raley et al. | |
| 2004/0049738 A1 | 3/2004 | Thompson et al. | |
| 2005/0144022 A1 | 6/2005 | Evans | |
| 2005/0240467 A1 | 10/2005 | Eckart et al. | |
| 2006/0015839 A1 | 1/2006 | Owens et al. | |
| 2006/0047780 A1 | 3/2006 | Patnude | |
| 2007/0198713 A1 | 8/2007 | Tsao et al. | |
| 2008/0148231 A1 | 6/2008 | Weber | |
| 2009/0217242 A1 | 8/2009 | Banks | |
| 2009/0300054 A1* | 12/2009 | Fisher | G06F 16/84 707/999.102 |
| 2011/0083069 A1 | 4/2011 | Paul et al. | |
| 2013/0191418 A1* | 7/2013 | Martin, Jr. | G06Q 30/0201 707/802 |
| 2016/0092476 A1* | 3/2016 | Stojanovic | G06F 16/2219 707/805 |
| 2018/0107724 A1* | 4/2018 | Ganjam | G06F 16/258 |
| 2019/0265982 A1* | 8/2019 | Mickelsson | H04L 41/0813 |
| 2020/0089797 A1* | 3/2020 | Rosen | G06F 11/3684 |
| 2021/0263900 A1* | 8/2021 | Joyce | G06F 16/2228 |
| 2021/0279165 A1* | 9/2021 | Rubin | G06F 11/3672 |

FOREIGN PATENT DOCUMENTS

| | | |
|---|---|---|
| KR | 101487192 B1 | 1/2015 |
| WO | 9824358 A2 | 6/1998 |
| WO | 2007068563 A1 | 6/2007 |
| WO | 2021126012 A1 | 6/2021 |

* cited by examiner

CONFIGURATION-DRIVEN DATA CONVERSION AND HOSTING FOR SOFTWARE DEVELOPMENT SYSTEMS AND METHODS

BACKGROUND

Organizations that develop software typically have several teams of software developers that each develop software modules to perform specific functions. These software modules are tested before they are deployed in a production environment. Development of a mobile application (e.g., a web-based application), for example, can require that multiple goals or requirements be taken into account, such as considering user preferences and attention spans, minimizing keystrokes, minimizing functions necessary to accomplish a task, and so forth. Other kinds of software can have different requirements, which can be stated in a software requirements specification (SRS). Software development and testing can be supported by mobile enterprise application platforms or integrated development environments (IDEs).

Development of software applications, such as for mobile devices, generally includes development of various front-end features, such as user interfaces (UIs) or other user-facing features. Front-end development can include, for example, ensuring that UIs are understandable and user-friendly, that they function as intended, and that front-end features otherwise meet all requirements. Front-end development can also include developing the look and feel of an application, such as colors, shapes, images, layout, input areas (e.g., fillable fields, menus, etc.), and so forth.

Front-end development relies on various back-end functions to support access to enterprise systems or other features. Back-end functions can include, for example, facilitating data routing, security, authentication, authorization, working offline, service orchestration, and so forth. Back-end functionality can be supported by various middleware components, such as application servers, mobile back-end as a service (MBaaS), service-oriented architecture (SOA) infrastructure, and so forth. Back-end features can also include middleware.

BRIEF DESCRIPTION OF THE DRAWINGS

This document provides detailed descriptions and explanations of implementations of the present technology using the accompanying drawings. The technologies described herein will become more apparent to people skilled in the art from studying the Detailed Description together with the drawings. Embodiments or implementations describing aspects of the invention are illustrated by way of example, and the same references can indicate similar elements. While the drawings depict various implementations for purposes of illustration, people skilled in the art will recognize that alternative implementations can be employed without departing from the principles of the present technologies. Accordingly, while specific implementations are shown in the drawings, the technology is amenable to various modifications.

DETAILED DESCRIPTION

Figure 1:
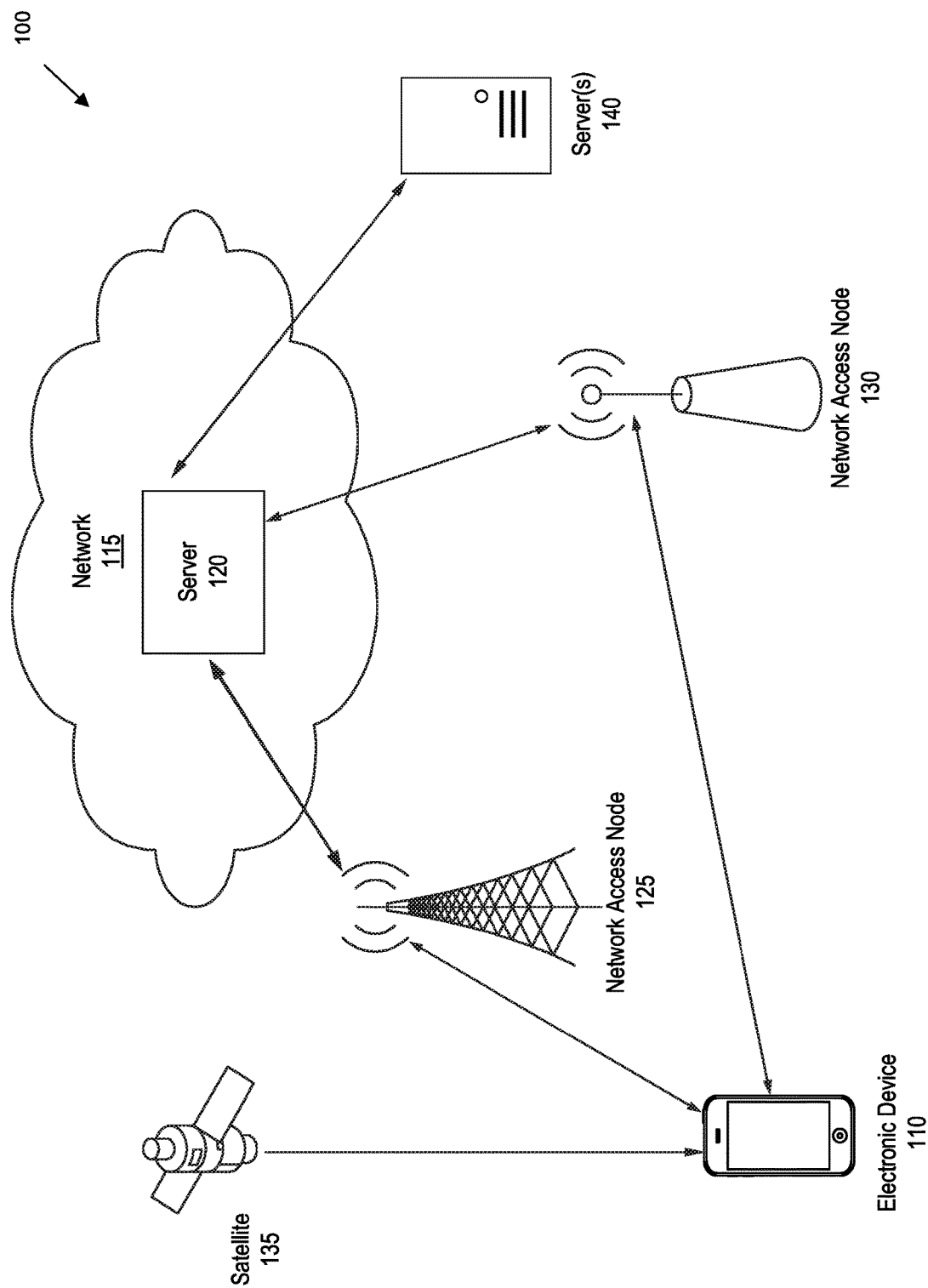
FIG. 1 is a block diagram that illustrates an environment in which the data conversion and hosting system operates.

Software developers face difficult technical challenges in ensuring that all goals and requirements for a software application, such as a web application, are achieved. Furthermore, software developers often face time pressures to release applications in a timely way, considering consumer demand, competition in the market, employer requirements, and so forth. But software developers often lack access to back-end features via which data can be provided to design and test front-end features (e.g., because the back-end features may not yet be complete and are being developed by a different team). For example, front-end developers are unable to determine whether the full range of front-end features will function as intended (e.g., by testing edge cases) before back-end features are operational because developers lack tools for efficient and automated provisioning of data in an appropriate format for design and/or testing of these front-end features. Instead, data available to developers may be in various formats that are not readily usable for design and testing of software features (e.g., one or more Excel files or CSV files, database dumps, etc.). Thus, software developers on one development team (e.g., a front-end development team) typically are unable to fully design and test their software until software developers on one or more other development teams (e.g., back-end development teams) have completed other software features unless they manually generate limited hard-coded data.

Before back-end features are built, front-end software developers typically have few options for accessing usable data for designing and testing front-end features. Back-end features are often needed, for example, to access and organize data that will be used by an application and to provide the data in a format that the front-end software can use. This data can come from, for example, customers, managers, and/or non-technical employees or contractors of an organization, and can be accessed via many sources, such as spreadsheets, business rules engines, application servers, databases, message buses, enterprise resource planning (ERP) systems, and so forth. Often, people with access to data used for design and testing are unlikely to have sufficient technical knowledge to convert the data from a raw format to processed data that can be consumed by front-end systems. Thus, front-end developers often must manually create limited hard-coded data to design and test front-end features, which is inefficient and time-consuming. Timely and accurate data is needed to ensure that all technical aspects of front-end software will function as intended. For example, without accurate data, front-end technical errors cannot be detected effectively, such as errors related to display of a sufficient number of digits in a numeric field, errors related to handling of different data types associated with a data field, rendering failures, slow parsing or rendering, displaying incorrect or incorrectly formatted information, and so forth. A system that provides timely and accurate data, therefore, provides technical advantages for identifying these and other errors and otherwise allowing developers to produce better software in a timelier way, thus improving technology for developing software.

For the above reasons and others, there exists a need for technologies that overcome these problems and provide other benefits. For example, there is a need for technologies that enable design and testing of front-end software features without the use of back-end features that may not be complete and that allow for fast and easy setup and teardown of data with a low learning curve. In addition, there is a need for technologies that provision this data in a format that is usable by the front-end features without requiring generation of complex code to convert the data or limited hard-coded data for design and testing.

This document discloses a system and methods that convert data for provisioning in a standardized format that can be used for designing and testing software features, such as front-end features ("system" or "data conversion system"). For example, a user (e.g., a developer who is designing a software application) initializes a software application and provides, to the system, one or more datasets comprising data from one or more sources, which can be in a standardized format, such as a comma-separated values (CSV) or other delimited text file, or an Excel file or other spreadsheet file, and/or in a non-standardized format, such as a Hierarchical Data Format (e.g., HDF5) or Parquet. The system then determines whether a configuration file exists, which specifies various parameters associated with the software. If the configuration file is found, the system accesses and parses the configuration file. The system further verifies the existence of the one or more datasets. Based on the configuration file, the system accesses at least a portion of the data in the one or more datasets and performs one or more conversions on the data to convert the data to a standardized format. Converting the data to the standardized format can include, for example, copying the data and/or structuring the data according to one or more internal data structures, which can be a database, standard files (e.g., flat files), or another data structure. The system then generates, using the converted data in the standardized format, a web server via which the converted data can be accessed (e.g., in response to a request). For example, the web server can be a built-in web server within the system that provides data in JavaScript Object Notation (JSON) format in response to a web request.

During operation, software can then access the converted data via the web server to perform operations. The system can be readily configured and reconfigured (e.g., based on a configuration file) by a user without the need for the user to modify any underlying code. For example, various configurations can be specified using the JSON format, and queries to select or retrieve data from various fields can be performed using Structured Query Language (SQL). Thus, users with only a basic knowledge of SQL can quickly create web application programming interfaces (APIs) to provide standardized data without the need to modify or generate underlying code. Furthermore, the system decreases latency compared to real production systems because the system includes in-memory data stores.

Advantages of the disclosed technology include the ability to perform more timely design and accurate testing of software features. For example, front-end software features can be designed and tested when back-end features are not yet operational or are otherwise unavailable. Additionally or alternatively, the disclosed technology can be used to test front-end software features when it is not desirable or preferable to use back-end features, such as to isolate the source of an error. In addition, data can be converted to a standardized format without the need to generate code to provide the data in the standardized format. Furthermore, the disclosed technology allows for front-end features to be designed and tested without dependencies on back-end features, which can be helpful to isolate and correct the source of errors. Overall, the disclosed technology enables developers, such as front-end developers, to produce better software, identify and correct errors, and conduct more timely design and accurate testing of software features, among other benefits. Although examples included herein generally describe design and testing of front-end software features, the disclosed system can be applied in other ways. In general, the disclosed system can be applied in any situation where data is used in a standardized format to design and test software features.

Descriptions in this document and the associated drawings are illustrative examples and are not to be construed as limiting. This disclosure provides certain details for a thorough understanding and an enabling description of these examples. A person skilled in the relevant technology will understand, however, that the invention can be practiced without many of these details. Likewise, a person skilled in the relevant technology will understand that the invention can include well-known structures or features that are not shown or described in detail to avoid unnecessarily obscuring the descriptions of examples.

Suitable Environments

FIG. 1 is a block diagram that illustrates a suitable environment 100 within which a system for converting test data for provisioning in a standardized format operates. The environment 100 includes one or more networks 115, which can include telecommunications networks accessed by subscribers via electronic devices 110. Electronic devices 110 can include, without limitation, mobile devices or other user equipment (UE) associated with subscribers, such as smartphones or other mobile phones, tablet computers, laptop computers, desktop computers, wearable devices, internet of things (IoT) or other connected devices, and so on. Subscribers use electronic devices 110 to access various hardware and software functions, such as using software applications, which can be provided via the one or more networks 115 using servers 120 and/or 140. Electronic devices 110 access the one or more networks via satellites 135, base stations 125 and/or network access nodes 130.

Software developers create and test various software applications that operate on electronic devices 110. These applications can include, for example, messaging applications, entertainment applications, applications for accessing services (e.g., services of a telecommunications service provider or a third party), other web applications, and so forth. While at least a portion of software applications can reside on electronic devices 110, other portions of software applications can reside on server 120 and/or server 140. Additionally, during operation, software applications can access or receive data stored on server 120 and/or server 140.

However, before software applications are made available to subscribers associated with electronic devices 110 or otherwise deployed, software developers design and test features of the software applications and/or hardware functions associated with the software applications. For example, a front-end developer generates various front-end features of the software application, such as interfaces that will display on a subscriber's mobile device and other user-facing features. To test one or more functions of the front-end features, the developer provides a test input, such as via an electronic device 110. The test input can be any input provided to the software application, such as submitting text or photos, pressing a button, selecting an icon, giving a voice command, making a gesture, placing a call, sending a message, and so forth. During design and testing, other software features, such as back-end features, might be unavailable. Additionally or alternatively, developers may wish to test front-end features and back-end features separately, for example, to reduce dependencies or to isolate errors. Accordingly, the disclosed system provides data that has been aggregated and converted to a standardized format which allows actions to be taken, by the software application, without various middleware and/or various back-end features. The data provided by the system, thus, allows for the front-end features to be designed and tested independently from middleware and/or back-end features of the software application, which may not be available (e.g., because they have not yet been generated).

All or portions of the data conversion system can reside, for example, on electronic devices 110, server 120, and/or server 140. For example, the data conversion system can include a web server and an in-memory database or other data structure, which can be provided using a server 120 associated with a telecommunications service provider that provides the network 115. Additionally or alternatively, a web server and/or in-memory database can be provided using one or more servers 140 associated with a third-party service that provides all or portions of the data conversion system. In some implementations, the data conversion system may reside or operate on electronic device 110, such that the electronic device 110 need not access a network 115 and/or a third-party server 140 to perform or test software functions.

Data Conversion System

Figure 2:
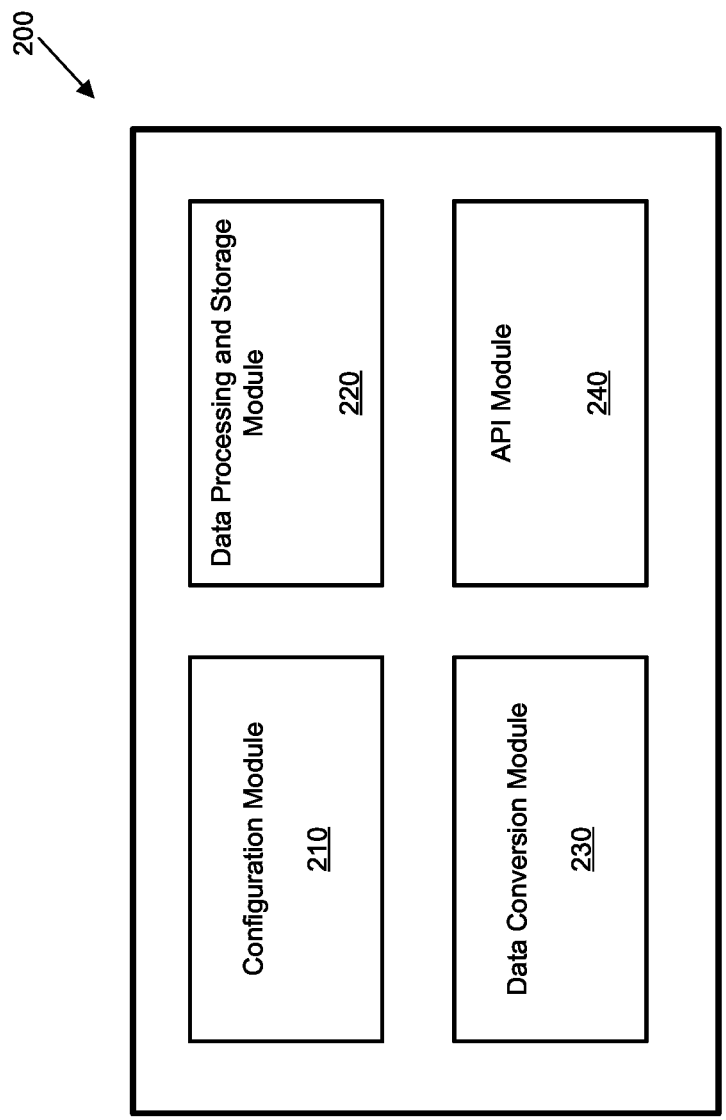
FIG. 2 is a block diagram that illustrates components of a system for converting and hosting data.

FIG. 2 is a block diagram illustrating components of a data conversion system 200 that converts data for provisioning in a standardized format to a software application, such as a mobile application. All or portions of the system 200 can be provided, for example, by a telecommunications service provider that provides one or more telecommunications networks, such as network 115, using one or more servers 120 upon which all or portions of the system 200 may reside. Additionally or alternatively, all or portions of the system 200 may be provided by a third-party service provider using one or more third-party servers, such as server 140. In these and other implementations, all or portions of the system 200 may additionally or alternatively reside on an electronic device 110, such as a mobile device associated with a subscriber of a telecommunications service provider.

The data conversion system 200 can include functional modules that are implemented with a combination of software (e.g., executable instructions or computer code) and hardware (e.g., one or more memories and one or more processors). Accordingly, as used herein, in some examples a module is a processor-implemented module or set of code, and represents one or more computing devices that are at least temporarily configured and/or programmed by executable instructions carried by one or more memories to perform one or more of the functions described herein. For example, the data conversion system 200 can include a configuration module 210, a data processing and storage module 220, an API generator module 230, and an API module 240, which are each discussed separately below.

Configuration Module

The configuration module 210 is configured and/or programmed to store/access/parse a configuration file associated with operations performed by a software application executing on a computing device, such as a mobile device. For example, the configuration module 210 comprises a parser that parses the configuration file associated with the software application. The configuration file can be structured in various ways, such as using JavaScript Object Notation (JSON), extensible markup language (XML), or YAML Ain't Markup Language (YAML) format, which can be opened and edited in a text editor. Each configuration file can comprise or specify, for example, one or more source files containing data, endpoint names associated with test data, Representational state transfer (REST) verbs and/or SQL statements, paths to one or more SQL files, and so forth. The configuration file can comprise, for example, information or instructions associated with one or more tables to be created, such as a file where data can be accessed and loaded into the table, a separator used in the file (e.g., comma, semicolon, tab, space, pipe, caret, etc.), and a name or other identifier for the table or the data (e.g., a mapping name assigned to the data). The configuration file can also include information associated with one or more endpoints, such as SQL endpoints where data from one or more of the tables can be accessed using SQL queries.

During operation, the configuration module 210 accesses and/or receives the configuration file, parses the contents of the configuration file, and creates or provides instructions for creation of at least one internal object based on parsing the contents of the configuration file. Parsing the one or more configuration files can also comprise validating the existence of one or more data source files and/or generating an error message when parsing fails, which may further include providing a hint regarding how to fix the error. When parsing of the configuration file is complete, the internal object is received at and/or accessed by the data processing and storage module 220 for creation of one or more data structures, as described herein below.

As described herein above, existing systems typically require that middleware and/or other back-end features of a software application must be operational, or that limited hard-coded data be created, to design and test front-end software functions of the applications, such as functions related to interfaces of a software application that is displayed on a device of an end user. By contrast, data received, accessed, and/or processed by the configuration module 210 can be data that is not associated with middleware and/or other back-end features. For example, the data can be configured to simulate data that would be accessed via middleware and/or other back-end functions, such as for designing and testing front-end features before middleware and/or other back-end features are operational or testing front-end features independently from middleware and/or other back-end features. In these and other implementations, the data can be actual data that will be provided via the back-end features.

Data Processing and Storage Module

The data processing and storage module 220 is configured and/or programmed to receive/access/store/process data. For example, the data processing and storage module 220 can receive and process one or more internal objects generated by the configuration module 210. Processing of the one or more internal objects can comprise, for example, verifying whether files can be opened and whether data within the files can be read. Additionally, in some implementations the data processing and storage module 220 can confirm, based on contents of one or more configuration files, integrity of a file and/or data within the file based on one or more associated hash values.

Data Conversion Module

The data conversion module 230 is configured and/or programmed to convert data and load the data into one or more in-memory internal data structures (e.g., as tables) configured for provisioning to front-end software features. In some implementations, the one or more internal in-memory data structures can be in-memory databases, which can optionally be indexed. The data can be received from and/or accessed using the data processing and storage module 220. The data can include, for example, non-structured or non-standardized data used for performing various functions of a software application. The data can simulate data that would be accessed and/or retrieved by a software application during operation.

The data conversion module 230 converts data (e.g., using one or more internal objects generated by the configuration module 210) for loading into the one or more in-memory data structures comprising or embodied in, for example, HDF5, Open Document, Parquet, ORC, Stata, SAS, SPSS and/or other file formats. Additionally or alternatively, the data conversion module 230 can generate and/or store converted test data in one or more file formats using Microsoft Excel or a similar spreadsheet application (e.g., XLS files or XLSX files) and/or storing the data in one or more delimited file formats, such as a comma-separated values (CSV) file or a tab-separated values file (TSV). The data conversion module 230 converts the test data to one or more of the foregoing standardized formats such that resulting data structures can be accessed using the API Module 240.

API Module

The API module 240 comprises, for example, a web server that serves RESTful endpoints over a network (e.g., network 115) to facilitate performance of one or more hardware and/or software functions associated with a software application using data in a standardized format. For example, the data can be data that has been converted by the data conversion module 230 and/or stored by the data processing and storage module 220. During operation, a user of the system 200 initializes a software application for testing and provides one or more test inputs, which invokes a REST API and provides one or more parameters (e.g., based at least in part on the test inputs). The endpoints via which the data is accessed via the API module 240 are specified in the configuration file, such as by defining a uniform resource locator (URL) endpoint, a corresponding file to be accessed, and one or more parameters. The API module 240 receives the internal object from the configuration module 210 and, based on the object, creates the web server and generates the API endpoints (for example, using REST verbs specified in the configuration file).

Converting Data to a Standardized Format

Figure 3:
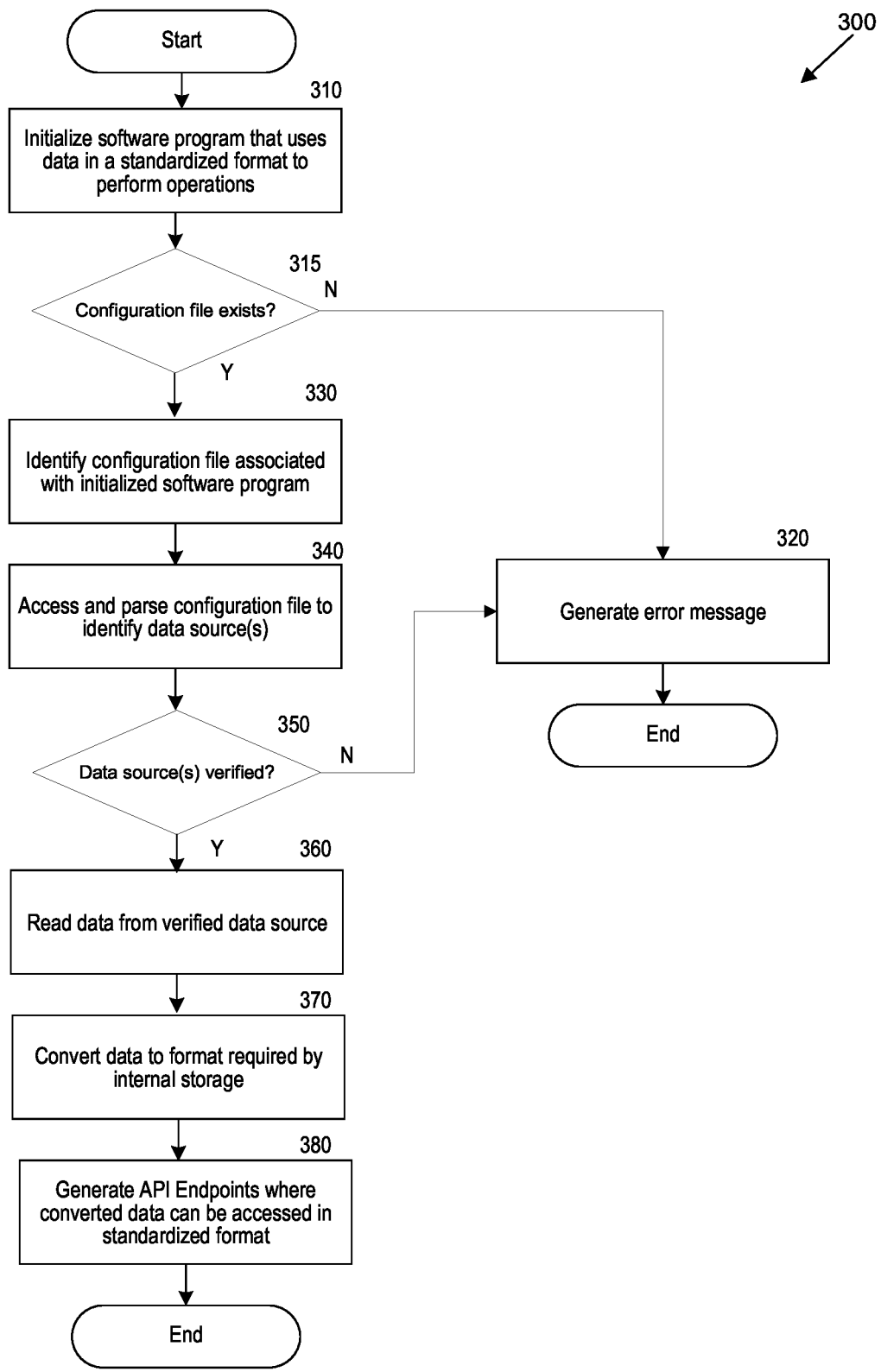
FIG. 3 is a flow diagram that illustrates an example process for converting data to a standardized format.

FIG. 3 is a flow diagram that illustrates a process 300 for converting data to a standardized format. In general, the process 300 converts received data to a standardized format such that the data can be provisioned to a software program (e.g., via an API) for performing one or more operations.

The process 300 begins at block 310, where a software program is initialized. The software program can be, for example, a web application that uses data in a standardized format (e.g., JSON format) to perform one or more operations.

The process 300 then proceeds to block 315, where it is determined whether a configuration file associated with the initialized software program exists. The configuration file comprises various parameters associated with the software program and/or data accessed by the software program, such as information regarding data structures associated with one or more data sources (e.g., tables) and/or endpoints where data can be accessed. The configuration file specifies one or more data sources for data to be used by the software program. The data comprises example data to be accessed by the software program. Types of data included in the data depend on functions of the software program. The test data can be received in a variety of formats, including, for example, a Microsoft Excel file or a CSV file. If a configuration file is determined, at block 315, not to exist then the process 300 generates an error message at block 320. If the configuration file exists, then the process 300 proceeds to block 330, where the configuration file is identified.

The process 300 proceeds block 340, where the configuration file is accessed and parsed, which includes identifying the one or more data sources that provide access to the data to be used by the software program.

The process 300 then proceeds to block 350, where the one or more data sources are verified based on contents of the configuration file accessed and parsed at block 340. Verifying the data sources can comprise, for example, verifying the existence and location of a file containing data (e.g., an Excel file) and/or data included in the file. As another example, verifying the data sources can comprise verifying a relational data store with identified data tables. If the data sources cannot be verified, then the process 300 proceeds to block 320, where an error message is generated.

When the data sources are verified, then the process 300 proceeds to block 360, where data in at least a portion of the data sources is accessed/read, based on instructions contained in the configuration file accessed and parsed at block 340.

The process 300 then proceeds to block 370, where, based on contents of the configuration file, the data is converted to a standard format. For example, the data can be copied and/or loaded into one or more internal data structures specified by the configuration file. Converting the data can comprise, for example, storing the data in an in-system database, flat files, tables, and/or other data structures, based on instructions contained in the configuration file. The converted data is, thus, prepared for provisioning in response to a query, such as a SQL query, based on endpoints specified in the configuration file.

Provisioning Converted Data in Response to a Resource Request

Figure 4:
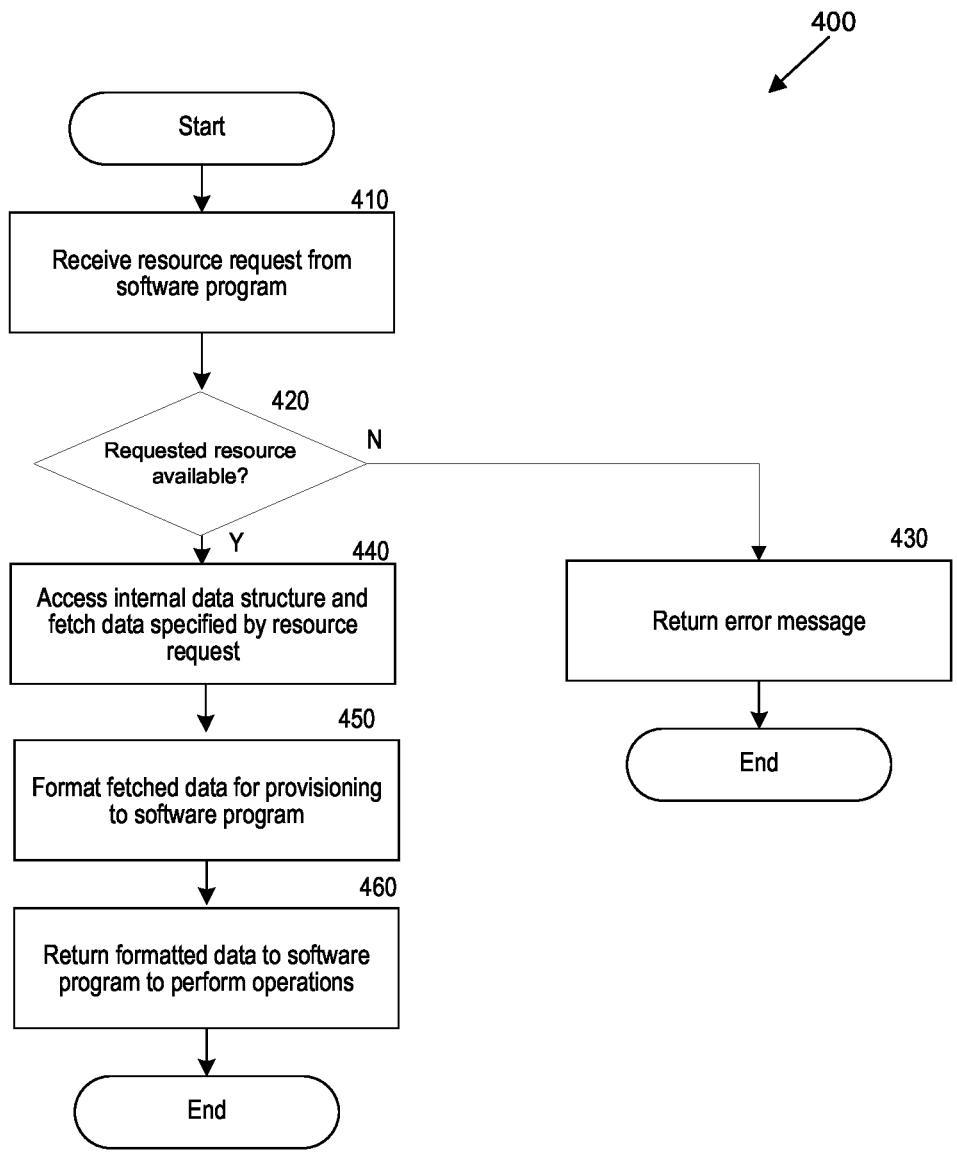
FIG. 4 is a flow diagram that illustrates an example process for responding to a request.

FIG. 4 is a flow diagram that illustrates a process 400 for using a data conversion system to provide converted data to a software program in response to a resource request.

The process 400 begins at block 410, where the system receives a resource request. For example, the resource request can be received in response to receiving an input via a front-end feature of a software application such as an interface. A user, such as a front-end developer, provides the input to perform one or more operations of a software application. Types of inputs can depend on one or more requirements specified in a software requirements specification (SRS), which can include desired inputs and outputs of a software application. Based on the input, the software application generates a resource request that is received by the system, such as a SQL query.

The process 400 then proceeds to block 420, where the system determines whether the requested resource is available. For example, the system can determine whether a specified API endpoint is available.

If the requested resource is not available, then the process 400 proceeds to block 430, where the system returns an error message in response to the resource request.

If the requested resource is available, then the process 400 proceeds to block 440, where data is accessed in response to the resource request. The data is fetched from an internal data structure of the system (e.g., a data structure where the data is loaded at block 370 of process 300).

The process 400 then proceeds to block 450, where the data is formatted for provisioning in response to the resource request. Formatting the data can comprise, for example, putting the data in a standard format, such as JSON format.

The process 400 then proceeds to block 460, where the data is returned in response to the resource request. The data, once returned, can be consumed and used by the software application that generated the resource request for performing one or more operations. The performance of the one or more operations allows a user (e.g., a developer) to test, evaluate, and/or design various features of the software application. For example, the one or more operations performed by the software application can be compared to expected actions, such as desired outputs, described in a SRS.

Evaluating Software Functions Using Data Conversion System

Figure 5:
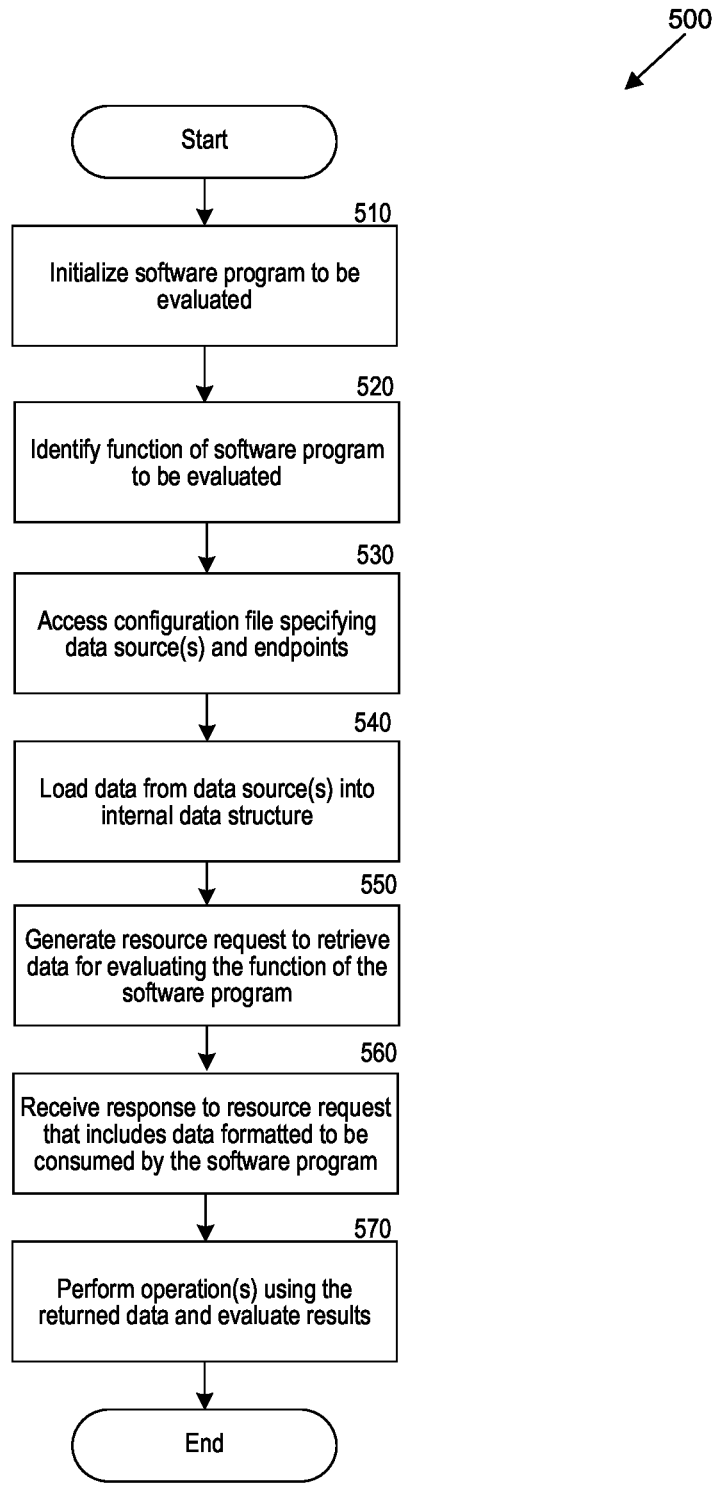
FIG. 5 is a flow diagram that illustrates an example process for evaluating functions of a software application using a system for converting and hosting data.

FIG. 5 is a flow diagram that illustrates a process 500 for evaluating functions of a software program using a data conversion system.

The process 500 begins at block 510, where the software program is initialized. The software program can comprise one or more front-end features of a software application, such as one or more interfaces, being developed and evaluated by a user (e.g., a front-end developer).

The process 500 proceeds to block 520, where one or more functions of the software program are identified for evaluation (e.g., testing). For example, one or more functions can be selected by the user, including display of one or more graphical features and/or outputs in response to inputs received from the user. The one or more functions can be selected in various ways, such as by selecting a button or icon, selecting from a drop-down menu of functions to be evaluated, receiving text inputs, and so forth.

The process 500 then proceeds to block 530, where a configuration file associated with the software program is accessed. The configuration file specifies one or more data sources (e.g., Excel files and/or CSV files) to be accessed that contain data for evaluating the functions of the software program and one or more endpoints where the data can be retrieved.

The process 500 then proceeds to block 540, where, based on the configuration file, the data from the one or more data sources is loaded into an internal data structure of the data conversion system.

The process 500 then proceeds to block 550, where a resource request is generated by the software program. The resource request includes a request to retrieve at least a portion of the data from the data sources. The resource request can be generated, for example, in response to receiving an input from the user and via the software program. The resource request can be, for example, a SQL query.

The process 500 then proceeds to block 560, where a response is received from the data conversion system and by the software program. The response includes at least a portion of data from the data sources loaded into the internal data structure at block 540. The data received in the response to the resource request is formatted, by the conversion system, in a format that is consumable by the software program, such as JSON format.

The process 500 then proceeds to block 570, where the software program performs one or more operations using the data received at block 560 in response to the resource request. The one or more operations can be any operations performed by a software program, such as displaying the data received at block 560 and/or generating one or more outputs or interfaces. The operations can be based on requirements stated in a SRS. The results of the one or more operations performed at block 570 are evaluated to determine whether the software program functions as intended and/or to help design the software program. Evaluating the results can include, for example, checking for errors or unexpected actions, comparing one or more outputs to expected outputs, and so forth.

All or portions of processes 300, 400, and 500 can be performed in any order, including performing one or more operations in parallel. Additionally, operations can be added to or removed from processes 300, 400, or 500 without deviating from the teachings of the present disclosure. For example, process 400 can include receiving any number of test inputs, accessing data multiple times, and/or performing multiple actions.

Although examples described herein may relate to design and/or testing of front-end software features, processes 400 and 500 are not limited to only design and/or testing of front-end features, and can be used in relation to any software features that access data in a standardized format and perform operations based on the accessed data.

Computing System

Figure 6:
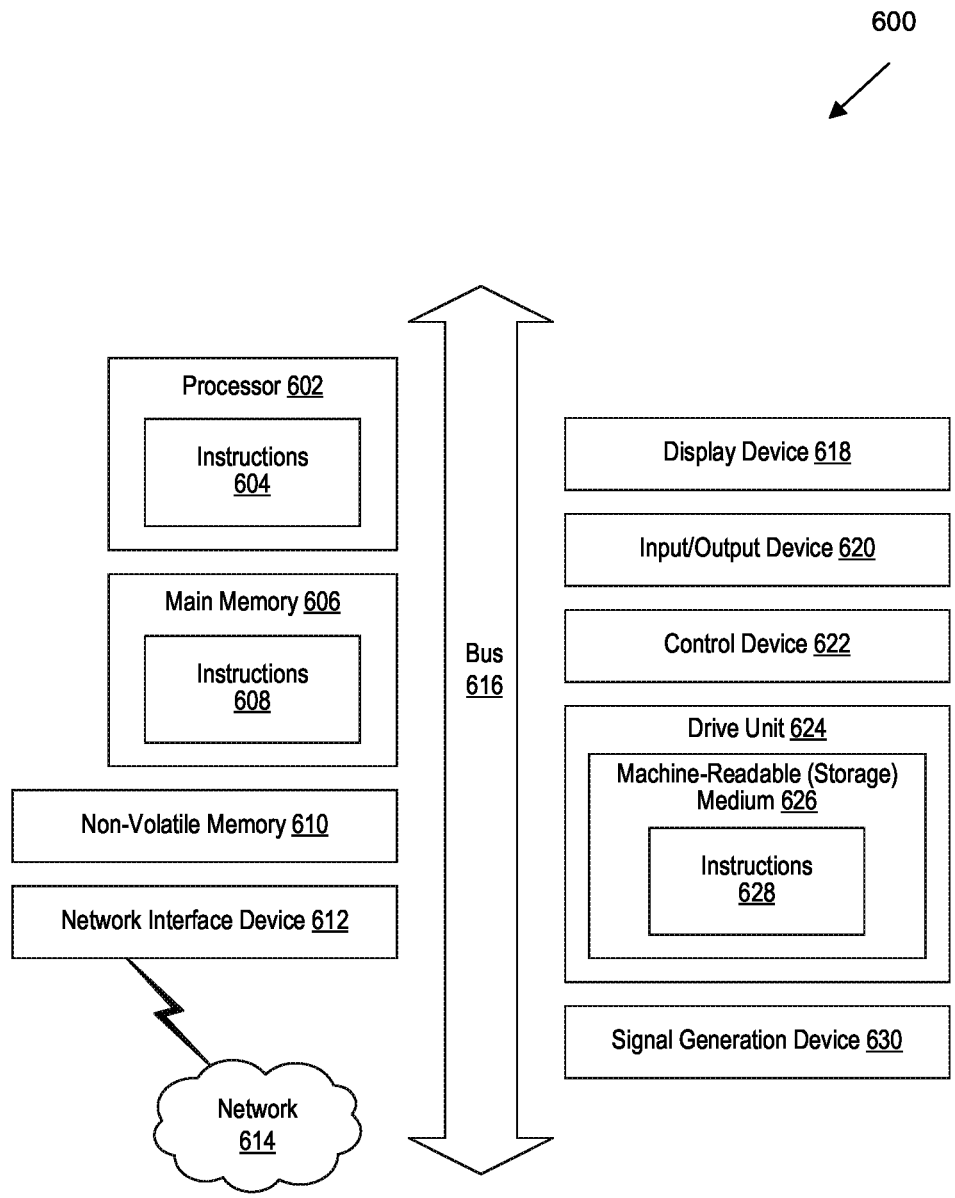
FIG. 6 is a block diagram that illustrates an example of a computing system in which at least some operations described herein can be implemented.

FIG. 6 is a block diagram that illustrates an example of a computing system 600 in which at least some operations described herein can be implemented. As shown, the computing system 600 can include: one or more processors 602, main memory 606, non-volatile memory 610, a network interface device 612, a display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computing system 600 is intended to illustrate a hardware device on which components illustrated or described relative to the examples of the figures and any other components described in this specification can be implemented.

The computing system 600 can take any suitable physical form. For example, the computing system 600 can share a similar architecture as that of a server computer (e.g., servers 120 and 140), personal computer (PC), tablet computer, mobile telephone, game console, music player, wearable electronic device, network-connected ("smart") device (e.g., a television or home assistant device), AR/VR systems (e.g., head-mounted display), or any electronic device (e.g. electronic device 110) capable of executing a set of instructions that specify action(s) to be taken by the computing system 600. In some implementation, the computing system 600 can be an embedded computer system, a system-on-chip (SOC), a single-board computer system (SBC) or a distributed system such as a mesh of computer systems or include one or more cloud components in one or more networks. Where appropriate, one or more computing systems 600 can perform operations in real-time, near real-time, or in batch mode.

The network interface device 612 enables the computing system 600 to mediate data in a network 614 (e.g. network 115) with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, and/or distributed. Although shown as a single medium, the machine-readable medium 626 can include multiple media (e.g., a centralized/distributed database and/ or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices (e.g., non-volatile memory 610), removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A computing system, comprising:
one or more hardware processors; and
one or more memories carrying instructions that, when executed by the one or more hardware processors, cause the computing system to perform operations to evaluate software program functions using data converted to a standardized format, the operations comprising:
initializing a software program;
identifying at least one function of the software program to be evaluated,
wherein the at least one function of the software program is configured to receive data in a standardized format;
accessing a configuration file associated with the software program,
wherein the configuration file specifies at least one data source containing data for evaluating the at least one function of the software program,
wherein the data for evaluating the at least one function of the software program is not in the standardized format, and
wherein the configuration file specifies a set of endpoints;
based on the configuration file, enabling loading of the data for evaluating the at least one function of the software program in an internal data structure;
generating a request to retrieve at least a portion of the data from the internal data structure,
wherein the request specifies at least one endpoint of the set of endpoints where the data can be retrieved;
receiving, in response to the request, the at least a portion of the data,
wherein the at least a portion of the data is formatted in the standardized format; and
performing at least one operation using the received at least a portion of the data,
wherein the at least one operation is to evaluate the at least one function of the software program.

2. The computing system of claim 1, wherein identifying the at least one function of the software program to be evaluated includes receiving, from a user, a selection of the at least one function of the software program to be evaluated.

3. The computing system of claim 1, wherein the at least one data source includes a spreadsheet file or a delimited file.

4. The computing system of claim 1, wherein the at least one data source includes two or more data sources that are aggregated.

5. The computing system of claim 1, wherein each endpoint in the set of endpoints includes a uniform resource locator (URL) and a SQL file.

6. The computing system of claim 1, wherein the at least a portion of the data is received via a web server that provides data in JavaScript Object Notation (JSON) format.

7. The computing system of claim 1, wherein the software program comprises one or more front-end software features for development or testing, and wherein the request includes a SQL query.

8. At least one computer-readable medium, excluding transitory signals, carrying instructions that, when executed by at least one processor, cause the at least one processor to perform operations for testing software functions, the operations comprising:
receiving an indication of a feature of at least one software module to be tested,
wherein the feature of the at least one software module consumes data in a standard format;
identifying a configuration file for the at least one software module,
wherein the configuration file specifies at least one data source containing data that is not in the standard format, and
wherein the configuration file specifies multiple endpoints;
causing the data contained in the data source to be loaded into a data structure;
generating a request to retrieve at least a portion of the data from the data structure,
wherein the request specifies at least one endpoint of the multiple endpoints where the data can be retrieved;
receiving, in response to the request, the at least a portion of the data,
wherein the at least a portion of the data is received in the standard format; and
testing the feature of the at least one software module using the received at least a portion of the data,
wherein the at least one software module consumes the at least a portion of the data in the standard format.

9. The at least one computer-readable medium of claim 8, wherein receiving the at least a portion of the data in response to the request includes providing an internal web server that provides the at least a portion of the data in JavaScript Object Notation (JSON) format.

10. The at least one computer-readable medium of claim 8, wherein receiving the indication of the feature of the at least one software module to be tested includes receiving a selection of a button or icon, receiving a selection from a drop-down menu, receiving text inputs, or any combination thereof.

11. The at least one computer-readable medium of claim 8, wherein the at least one data source includes a spreadsheet file or a delimited file, the operations further comprising:
verifying the at least one data source, verifying data in the at least one data source, or both.

12. The at least one computer-readable medium of claim 8, wherein the at least one data source includes multiple data sources that are aggregated.

13. The at least one computer-readable medium of claim 8, wherein at least a portion of the multiple endpoints include a uniform resource locator (URL) and a SQL file.

14. The at least one computer-readable medium of claim 8, wherein the feature of the at least one software module to be tested is a front-end feature.

15. At least one computer-readable medium, excluding transitory signals, carrying instructions configured to cause at least one processor to perform operations to evaluate software program functions using data converted to a standardized format, the operations comprising:
- initializing a software program;
- identifying at least one function of the software program to be evaluated,
  - wherein the at least one function of the software program is configured to receive data in a standardized format;
- accessing a configuration file associated with the software program,
  - wherein the configuration file specifies at least one data source containing data for evaluating the at least one function of the software program,
  - wherein the data for evaluating the at least one function of the software program is not in the standardized format, and
  - wherein the configuration file specifies a set of endpoints;
- based on the configuration file, enabling loading of the data for evaluating the at least one function of the software program in an internal data structure;
- generating a request to retrieve at least a portion of the data from the internal data structure,
  - wherein the request specifies at least one endpoint of the set of endpoints where the data can be retrieved;
- receiving, in response to the request, the at least a portion of the data,
  - wherein the at least a portion of the data is formatted in the standardized format; and
- performing at least one operation using the received at least a portion of the data,
  - wherein the at least one operation is to evaluate the at least one function of the software program.

16. The at least one computer-readable medium of claim 15, wherein identifying the at least one function of the software program to be evaluated includes receiving, from a user, a selection of the at least one function of the software program to be evaluated.

17. The at least one computer-readable medium of claim 15, wherein the at least one data source includes a spreadsheet file or a delimited file.

18. The at least one computer-readable medium of claim 15, wherein the at least one data source includes two or more data sources that are aggregated.

19. The at least one computer-readable medium of claim 15:
- wherein each endpoint in the set of endpoints includes a uniform resource locator (URL) and a SQL file, and
- wherein the at least a portion of the data is received via a web server that provides data in JavaScript Object Notation (JSON) format.

20. The at least one computer-readable medium of claim 15, wherein the software program comprises one or more front-end software features for development or testing, and wherein the request includes a SQL query.

* * * * *